United States Patent [19]

Haslund

[11] Patent Number: 4,703,904
[45] Date of Patent: Nov. 3, 1987

[54] APPARATUS AND METHOD FOR PROVIDING AN AERO-OPTICAL INTERFACE

[75] Inventor: Ralph L. Haslund, Mercer Island, Wash.

[73] Assignee: The Boeing Company, Seattle, Wash.

[21] Appl. No.: 623,152

[22] Filed: Jun. 21, 1984

[51] Int. Cl.$^4$ .............................................. B64D 47/00
[52] U.S. Cl. ..................................... 244/1 R; 244/198; 244/207; 244/130; 350/319; 350/584
[58] Field of Search ................. 244/1 R, 200, 129.1, 244/198, 129.3, 204, 207, 53 B, 130; 350/319, 584

[56] References Cited

U.S. PATENT DOCUMENTS

| | | | |
|---|---|---|---|
| 3,128,063 | 4/1964 | Kaplan | 244/207 |
| 3,836,237 | 9/1974 | Egan et al. | 250/319 |
| 3,933,327 | 1/1976 | Cook et al. | 244/207 |
| 3,934,846 | 1/1976 | Maurer | 244/130 |
| 4,117,995 | 10/1978 | Runge | 244/207 |
| 4,121,606 | 10/1978 | Holland | 244/53 B |
| 4,131,252 | 12/1978 | Dean et al. | 244/130 |
| 4,172,428 | 10/1979 | Pariset | 350/319 |
| 4,240,691 | 12/1980 | Holmqvist et al. | 350/584 |
| 4,245,803 | 1/1981 | DeBlois | 244/53 B |
| 4,277,131 | 7/1981 | Hart et al. | 350/584 |

Primary Examiner—Galen Barefoot
Attorney, Agent, or Firm—Schwartz, Jeffery, Schwaab, Mack, Blumenthal & Evans

[57] ABSTRACT

A method and apparatus for providing an aero-optical interface by stabilizing a shear layer in a fluid flowing over an aperture. The apparatus extracts fluid from a remote part of the flowing fluid and conveys it to the underside of the shear layer where it feeds the shear layer and prevents the shear layer from deflecting into the cavity underlying the aperture. A preferred embodiment also includes a ramp downstream of the aperture. Stability of the shear layer is optimized by placing the aperture where the pressure distribution absent the aperture would have been constant. The resulting thin, self-similar shear layer is an optimized viscid flowfield interface for uniform transmission of optical radiation.

25 Claims, 7 Drawing Figures

APPARATUS AND METHOD FOR PROVIDING AN AERO-OPTICAL INTERFACE

BACKGROUND OF THE INVENTION

This invention relates to an apparatus and method for providing an aero-optical interface by controlling a shear layer in a fluid flowing past a cavity having an aperture opening into a surface. It has particular but not exclusive application in the area of providing uniform, low-loss optical transmission to and from an aircraft through a shear layer such as in radiation and laser window design.

In the relatively new field of aero-optics, the goal is to obtain a high-quality optical window which affects radiation propagating therethrough as little as possible. Typically, apertures opening into cavities are placed in the surfaces of aircraft for transmission and receipt of optical wavelength radiation. The air flowing past such an aperture creates a shear layer starting at the upstream edge or so-called separation corner of the aperture. Transmission through this layer is governed by spatial and temporal variation in the index of refraction, the scale sizes of the variations, the layer thickness, and the optical wavelength. This shear layer, which thickens along the streamwise length of the aperture, reduces the pressure within the cavity through a viscous turbulent flow entrainment pumping action. The reduced pressure within the cavity deflects part of the shear flow into the cavity. An equilibrium condition is attained when the shear flow mass deflected into the cavity just equals the mass lost through viscous pumping. The process can be conceived of as part of the shear layer being deflected and peeled off into the cavity, recirculating through the cavity, and rejoining or "feeding" the underside of the shear layer. Because this process is, by itself, unstable, there are strong fluctuations in the position of the shear layer and in the pressure levels inside the cavity.

In addition to causing an undesirable cavity environment, the unsteady flow causes losses in the uniformity and intensity of transmitted optical radiation. These losses are the same whether the radiation is directed outward from the aircraft, as from an aircraft-mounted laser, or inward into the aircraft, as in an aircraft-mounted sensor. Non-uniformities in transmitited intensity and net angle of refraction in such arrangements are caused by scattering of radiation as it passes through the shear layer due to local variations in the shear layer refractive index, which are in turn a product of both small and large scale variations in pressure, turbulence, and velocity distribution. Transmitted optical quality losses are exacerbated by the thickening of the shear layer and increases in turbulence scale size as it trails away from the leading (upstream) edge of the aperture unless there is a corresponding decrease in the intensity of refractive index variations.

One known technique for attempting to create an optical-quality shear layer involves placing a partially porous barrier or "fence" just upstream of the aperture. Such a technique is used in the NASA Ames Airborne Observatory, and described in D. A. Buell's paper entitled, "Airloads Near the Open Port of a One-Meter Airborne Telescope," presented at the AAIA 13th Aerospace Sciences Meeting, (1975). The flow deflection by the fence displaces the shear layer relative to the downstream end of the opening and reduces pressure over the cavity. The fence, in effect, isolates the shear layer from the cavity by providing air to the underside of the shear layer from the freestream through the porous fence rather than from the cavity. Fences are typically up to one-quarter the aperture length in height and are about 50% porous. While the porous fence technique has proven excellent for controlling the pressure across fluid mechanical exit ducts, it does so by thickening the shear layer, adding relatively large scale turbulence, and inhibiting the development of shear flow self-similarity. These three effects make the porous fence technique unsuitable as a technique for obtaining an aero-optical interface due to resultant increased scattering losses in intensity and non-uniform refraction. This is especially true at freestream Mach numbers above about 0.5 due to the formation of locally supersonic flow which extends the shear layer out to the top of the recompression shock which is unstably extended above the fence.

In short, the prior art methods, such as the fence or cavity alone are limited in usefulness to very low density and/or long wavelength optical transmission because, in general, they provide thickened, increased turbulence as well as non-self-similar and unsteady shear flow distributions, and unsteady shear flow reattachment.

SUMMARY OF THE INVENTION

The invention is directed to an apparatus for actively controlling the free shear layer over an aperture or a cavity opening in such a way that aero-optical transmission characteristics therethrough are optimized. Transmission optimization is achieved through obtaining a well-behaved shear layer with well-determined properties. The well-behaved shear layer is produced by optimizing its growth and by effectively decoupling it from the cavity. In accordance with the invention, this decoupling is accomplished by feeding the shear layer with a bleed flow of air taken from a source other than the shear layer. In the preferred embodiment, air fed to the shear layer is at substantially the same total temperature as air already in the shear layer, thus eliminating a relatively strong temperature dependent local variation in turbulence index of refraction, which is a source of optical scattering. That is, it is important that the flowing adjacent turbulence cells which have entered the shear layer from opposite sides and are at the same mean velocity have identical indexes of refraction. Also, in the preferred embodiment, providing a contained ramp downstream of the cavity aperture facilitates smooth reattachment and collapse of the velocity profile of the shear layer. Use of these techniques helps ensure a well-behaved shear layer, having the properties that the loss of optical intensity is minimized and the transmitted intensity and net angle of refraction over the streamwise length of the cavity do not vary substantially. These properties are optimally exploited in the preferred embodiment by positioning the aperture in the surface of the aircraft so that the pressure distribution over the surface at that location absent the aperture would have been constant, thereby ensuring that the velocity of air at the outer edge of the shear layer over the aperture is also constant.

The invention takes advantage of the fact that in a naturally (without fence or cavity interaction) developing shear layer the local intensity of variation in index of refraction, turbulence scale size, and local width are related in such a way that the flow is self-similar and the integrated effect on parallel optical paths of radiation propagating through the shear layer is the same regardless of where the paths enter the shear layer. The invention thus optimizes optical transmission through a shear layer by minimizing attenuation, and by providing the conditions for temporal and spatial transmission uniformity everywhere through the shear layer.

BRIEF DESCRIPTION OF THE DRAWINGS

These and other features and advantages of the invention will become more fully apparent from the following detailed description taken together with the following drawings, in which.

DETAILED DESCRIPTION OF THE PREFERRED EMBODIMENTS

Figure 1:
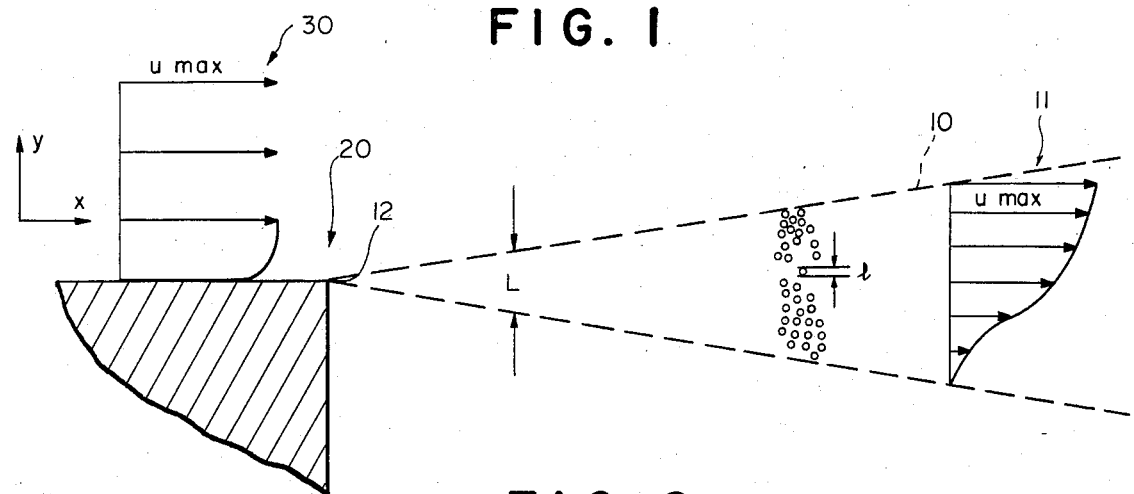
FIG. 1 is a diagram depicting a shear flow separation model at a boundary edge.

Throughout the following description, similar reference numerals refer to similar elements in all figures of the drawings. It will also be understood throughout the following description that the term "fluid" refers primarily to air, but that the teachings of the present invention can be readily transferred to any other circumstance where it is desired to have a shear layer in a fluid other than air which does not distort optical radiation propagated therethrough.

The classic two-dimensional case of a fully developed shear layer is shown diagrammatically in FIG. 1. As depicted therein, the shear layer 10 starts at separation corner 20. The velocity profile 11 in such a shear layer has constant values along rays drawn from the upstream apex 12 and so is self-similar with distance in the x-direction (streamwise). The width, L, in the y-direction increases linearly with distance after a very short formative length in which effects of the upstream solid wall boundary layer velocity profile 30, depicted as three vectors, are dissipated. The local growth angle is a weak function of a local edge flow Mach number. It is well known that the turbulence scale size, l, grows linearly with local shear layer width. Two-dimensional shear flow characteristics hold over all layers for which L is small compared to the upstream surface lateral radius of curvature, such as over most aircraft fuselage sections.

Figure 2:
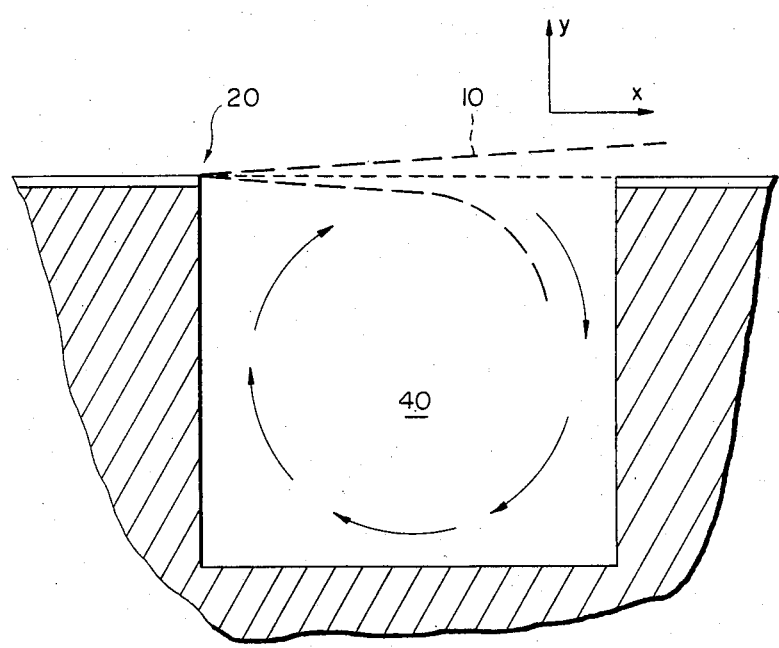
FIG. 2 is a diagram of deflected shear flow over and recirculated within a model cavity.

As set out in the description of the prior art, and shown in FIG. 2, when the shear layer 10 is created over an open cavity 40, an additional phenomenon occurs. As the shear layer continues in the x-direction, it causes a viscous pumping action which reduces the pressure inside cavity 40. This causes the shear layer 10 to deflect into the cavity 40, thus creating a vortex-type flow and recirculation within the cavity.

Figure 3:
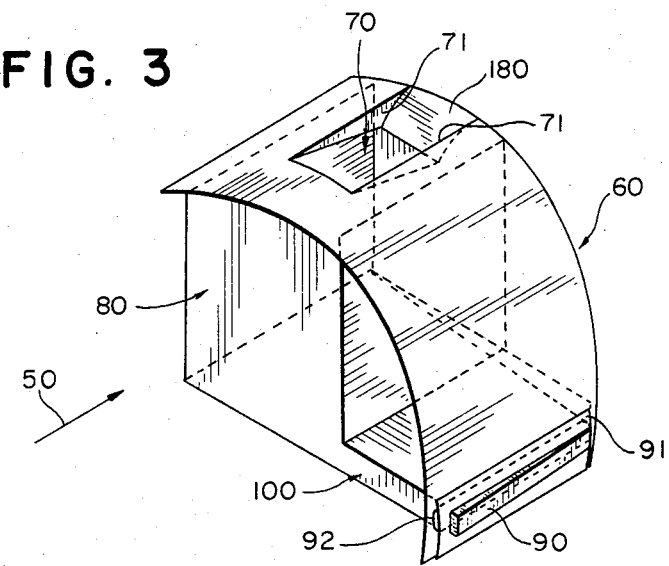
FIG. 3 is a perspective view of a section of an aircraft fuselage incorporating the teachings of the invention.

An apparatus for stabilizing a shear layer to facilitate optical wavelength transmission therethrough is shown in FIG. 3. The figure is a perspective of a section of an aircraft fuselage moving so that the flow of air passing over the surface is in the direction of arrow 50. The aircraft fuselage section, indicated generally by 60, has cut into it an aperture 70. Beneath aperture 70, within fuselage section 60, is cavity or cavity region 80, shown partially in phantom. In a typical application, cavity 80 would house equipment for sending or receiving optical radiation. FIG. 3 also shows fluid directing means comprising fluid extracting means 90 and duct means 100, and ramp means 180.

In operation, air enters fuselage portion 60 through fluid extracting means 90 which, in the preferred embodiment is a wedge-shaped inlet scoop of well-known configuration mounted atop a flow splitter plate 91 which is in turn mounted on and parallel to the fuselage surface 60 by spacer 92. The air then passes uniformly through duct means 100, cavity 80 and out through aperture 70. This prevents the shear layer, which has formed over aperture 70, from deflecting into the cavity.

Aperture 70 will, of course, be dimensioned so that at minimum it will be sufficiently large to permit the unimpeded ingress and egress of optical radiation. As will be developed below, there is also a constraint on the maximum streamwise length of aperture 70 which arises out of imposition of the condition that shear layer flow be two-dimensionally self-similar, and the tendency of the shear layer to become axisymmetric as it thickens. Conservatively, it is preferred to make the aperture length less than or equal to the radius of curvature of the local body section in which the aperture is located.

The function of flow splitter plate 91 is to ensure that air entering fluid extracting means 90 is at the same total temperature as air in the shear layer occurring over aperture 70, that is, the freestream total temperature. The total temperature, also known as the stagnation temperature, is the temperature a moving fluid would have if brought to rest adiabatically, i.e., without a gain or loss in heat content. Since air entering fluid extracting means 90 mixes with air in the shear layer, it is desirable that the entering air have the same total temperature as that already in the shear layer. Otherwise, adjacent turbulence cells in the shear layer would have different indices of refraction; there would be no compensating relationship between $\overline{<\Delta n>}$, $\overline{l}$, and L as described below, so that severe scattering losses would ensue. Air not at substantially the same total temperature as that in the shear layer is confined to a region immediately adjacent the outer surface of fuselage section 60. It is in this region alone that the total temperature of the air can vary through direct heat exchange with the surface. Therefore, the expedient of elevating fluid extracting means 90 atop flow splitter plate 91, a per se well-known device, ensures that only air which has not exchanged heat with the surface is conveyed and fed to the shear layer. To achieve this end, flow splitter plate 91 is positioned 1–2 inches from the surface of fuselage section 60 by spacer 92. It is noteworthy in this regard that the velocity reaches more than 50% of its edge value in a distance from the surface (the y direction) less than 1% of the local boundary layer thickness. The intercepted high velocity flow above the splitter plate 91 thus has insufficient thermal interaction time to alter its total temperature from that of the freestream. Thermal isolation of the intercepted flow is further developed in time as the wall temperature approaches the adiabatic value for the finite thermal wall mass.

The theory behind the improved performance of shear layer stabilizer according to the present invention is postulated as follows. If a Gaussian intensity profile beam of wavelength $\lambda$ and centerline intensity $I_o$ is incident on a turbulent gas layer, such as an aircraft boundary layer over a material window or shear layer over an open port, of local width L and with local average turbulence scale size $\bar{l}$, which is very small compared to the beam diameter, then the transmitted spread out Gaussian beam centerline intensity I is given by the well-known relationship $$I = I_o \exp - \left( \frac{8\pi^2 \overline{<\Delta n>^2} \bar{l} L}{\lambda^2} \right)$$

where $\overline{<\Delta n>}$ is the average of the local rms variation in the index of refraction through the layer. Further, $$<\Delta n> = \beta <\rho'>$$

where $<\rho'>$ is the local rms variation in density and $\beta$ is the Dale-Gladstone constant, which is a function of $\lambda$ only. It is apparent that $I/I_o$, the Strehl ratio, can be increased by using long wavelengths and operating at low densities (high altitudes) independently of any shear layer properties. However, to get maximum transmission, the shear layer must be optimized.

The first step toward optimizing the shear layer is minimization of the numerator of the exponent, $\overline{<\Delta n>^2}\bar{l}L$, which varies as $\overline{<\rho'>^2}\bar{l}L$. To do this it is important not to interact with any more of the high velocity part of the flowfield than is absolutely necessary. An upstream porous fence, for example, as discussed above, is a very good anti-resonance device insofar as it suppresses oscillations otherwise generated at the downstream recompression corner, but it accomplishes this result at the expense of thickening the turbulent layer.

Measured flow property data for a plain 50° aperture turret (i.e., a 50° circular aperture centered in the shoulder plane of a hemisphere-cylinder placed cross-wise to flow) reveal that with the aperture centerline normal to the incident flow direction (1) the shear layer comes off the upstream edge of the aperture at an angle of about 65 degrees so that it overshoots the downstream corner without causing oscillations, and (2) the rms density variation is proportional to the du/dy component of vorticity (i.e., is proportional to the shear stress). By rotating the aperture until the shear layer from the upstream edge is parallel to the incident freestream direction, the same shear layer development relative to the aperture is retained and all that is required is a simple shallow downstream ramp to obtain steady reattachment. In a fully developed two-dimensional shear layer the local velocity is given by $$u = \frac{u_e}{2}\left(1 - \cos\frac{\pi y}{L}\right)$$

where $u=0$ at $y=0$ and $u=u_e$ at $y=L$. Performing the averaging integral gives $$\overline{<\rho'>} \propto \frac{u_e}{L}$$

The second step in shear layer optimization is to control its development so that it has identical effects on parallel rays. This requires taking advantage of the self-similarity property of the two-dimensional free shear layer. That is, as stated in the expression for u above, the velocity scales as y/L and is constant along rays drawn from the apex of the self-similar layer so that it is a function of angle only. The other property of a two-dimensional shear layer is $$\bar{l} \propto L$$

Figure 4:
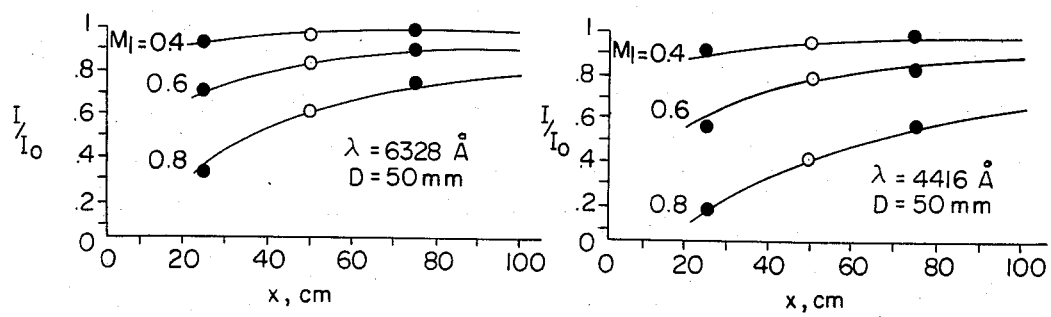
FIG. 4 is a graph showing the interrelationship of the theory underlying the present invention and empirical data.

Combining these relationships it is immediately seen that $$I/I_o \propto \exp(-u_e^2)$$

for a two-dimensional free shear layer and the transmitted intensity is independent of where the ray enters. This relationship was tested using the case of a two-dimensional turbulent jet. It is known that such a jet has the same turbulence characteristics as a free shear layer, and has a centerline velocity that varies as $1/x^{\frac{1}{2}}$. The predicted behavior is in very good agreement with the data tabulated from Catalano et al., NASA CP 2121 (April 1980), presented graphically in FIG. 4. FIG. 4 presents in two graphs data points for three jet initial Mach numbers (0.4, 0.6, and 0.8) and two wavelengths of optical radiation (6328 Angstroms and 4416 Angstroms). The data point at 50 cm downstream of the upstream edge of the aperture, represented by an open circle, was selected as a starting point, and the solid lines representing $I/I_o$ behavior according to the present theory were scaled in the upstream (left) and downstream (right) direction. As can be seen, there is good agreement between the predicted values of $I/I_o$ at approximately 25 and 75 cm, as represented by the solid line, and the actual values, represented by the solid data points. This confirms the basic model.

When the edge velocity is constant the shear layer width grows linearly with distance and achieves velocity profile self-similarity in a distance equal to $4\times10^5$ $\nu/u_e$, where $\nu$ is the kinetic viscosity.

In addition to uniformity of Strehl ratio across a self-similar free shear layer, there is also uniformity of refraction angle. That is, the angle at which a ray leaves the shear layer is a function of the angle at which it enters and not a function of where it enters. It is interesting to note that the effect of always bending a ray toward the normal on the higher index of refraction (cooler freestream) side in an image sensor system placed within cavity 80 is to make images forward and aft of approximately +2° transmission angle appear farther forward and aft, respectively. The asymmetry of the refraction angles for a ray entering and leaving the shear layer is a result of the shear layer temperature distribution. The refraction angle correction calculated for the shear layer can be included as a simple software requirement in the image sensor system. Because a rotation of the shear layer has the same effect as a rotation of the angle of incidence of a ray, it is necessary to keep the shear flow steady and with its centerline ($u=u_e/2$) aligned with the upstream surface.

In accordance with the principle of the invention, to obtain smooth, steady, undeflected free shear layer development it is necessary to provide a uniform bleed mass flow to the underside. Otherwise the shear layer, which acts like a viscous pump, will reduce the static pressure in the cavity through mass removal and will partially deflect itself into the cavity. Unfortunately, without a separate bleed mass flow, i.e., flow of a mass of air into the shear layer through its underside, the accompanying shear layer deflection process is unstable and normally leads to strong cavity pressure oscillations. By deliberately supplying bleed air the shear layer is effectively decoupled from the cavity and the mechanism to produce oscillations is removed. The theoretical minimum required amount of bleed air amounts to the order of 3% of the shear layer plan area multiplied by the incident freestream flow mass per unit area. The actual amount of bleed air will be larger in relation to the total pressure loss through the flow smoothing baffles, as required for the bleed air to enter the shear layer both uniformly and with very small scale turbulence. The required bleed flow normalized to the freestream mass flow per unit area is relatively insensitive to the edge flow Mach number. By increasing the zero deflection bleed flow rate by a factor of approximately 2.75, the shear layer can be deflected outward so that the underside thereof is in line with the upstream wall.

Thus, in theory, if the shear layer over an aperture is controlled in such a way that the edge flow maximum velocity is constant, then the exponential dependence of $I/I_o$ must also be constant. In other words, the exponent inverse dependence of the square of the average value of the root-mean-square variation of the index of refraction on $L^2$ just cancels the direct dependence of the exponent on $L$ and the average local turbulence scale size, $\tilde{l}$, on $L$. In principle, this relationship holds for varying edge flow velocity. In practice, however, constant edge flow velocity is necessary because it is only possible to match one pressure condition with the bleed flow. Thus, a hitherto unappreciated benefit from achieving a well-behaved shear layer is that it permits $I/I_o$ to be relatively constant over the entire self-similar shear layer for a given wavelength, especially if one takes the simple expedient of placing the cavity opening in a section of the aircraft surface over which the pressure coefficient in the absence of the cavity is constant (thus, automatically making edge velocity constant). An additional benefit is that parallel rays entering the shear layer are refracted through the same total or net angle regardless of where the rays enter the shear layer.

Fluid extracting means 90 and duct means 100 have been described above as comprising fluid directing means. It is conceivable that this fluid could come from a tank disposed within the aircraft or a similar source. The advantage of taking fluid from the freestream, as mentioned above, is that it is already at the same total temperature as the fluid in the shear layer. If a tank were used, a similar advantage could be obtained by disposing a heat exchanger in thermal contact between the freestream and the tank.

Figure 5:
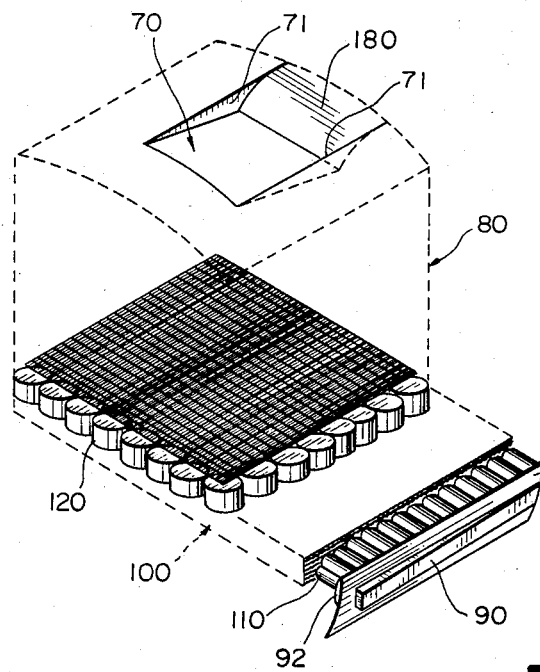
FIG. 5 is a perspective view of certain components as they would be arranged according to the invention.

FIG. 5, shows the arrangement of first and second flow smoothing means 110 and 120. Aperture 70, cavity 80, and duct means 100 are shown in phantom only. Aircraft section 60 has been omitted for the sake of clarity of illustration. First flow smoothing means 110 are disposed within duct means 100 adjacent to fluid extracting means 90 outside the splitter plate 91. Second flow smoothing means 120 are disposed in the other end of duct means 100 at the base of cavity 80. First and second flow smoothing means 110 and 120 may be any conventional apparatus for making flow uniform which, in this case, means preventing the formation of flow channels as well as large scale turbulence. This may be a simple baffle, such as a honeycomb and screen combination. A baffle with combined component resistance coefficient, given by the ratio of pressure drop across the baffle to the dynamic pressure entering the baffle, of about 2, in stages, is typically required to smooth the bleed flow. Baffle component porosity should be great enough to prevent formation of tiny jets; a porosity greater than approximately 50% normally meets this condition.

First and second flow smoothing means 110 and 120, together with duct means 100, comprise means for uniformly delivering fluid through cavity 80.

The importance of ensuring that the bleed flow is composed of fluid at substantially the same total temperature as that already in the shear layer has been repeatedly stressed above. Accordingly, it is desirable to make the bleed flow as adiabatic as practicable. This entails appropriately insulating duct means 100, as well as first and second flow smoothing means 110 and 120. It is also desirable to limit heat release into cavity 80.

Figure 6:
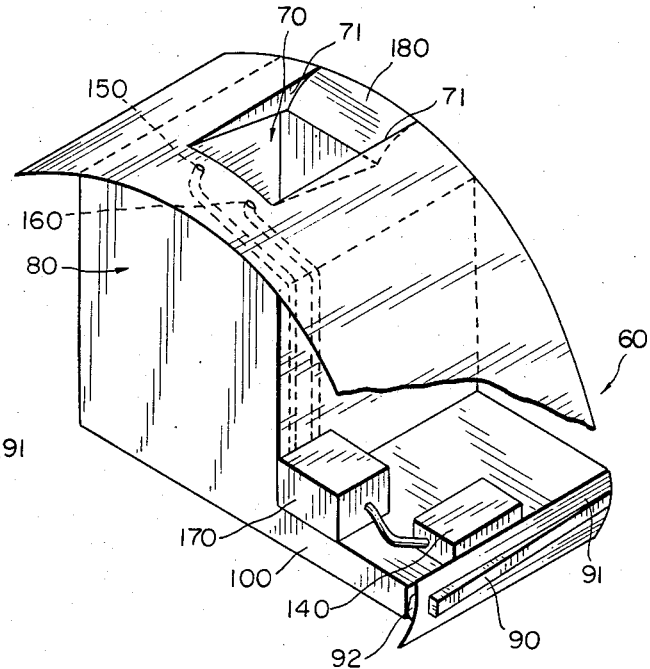
FIG. 6 is a perspective, partially cut away view of a section of aircraft fuselage showing the arrangement of certain other components according to the invention.

In theory, the air flow through cavity 80 could be constant if set great enough to overbalance a worst-case shear layer. The preferred embodiment, however, as illustrated in FIG. 6, shows means by which pressure underneath the shear layer is continuously and actively balanced against pressure above the shear layer. The size of the inlet opening, controlled by the angle of the wedge-shaped inlet scoop comprising fluid intake means 90 in the preferred embodiment, is adjustable by intake control means 140, represented by a box in the figure, which is any well-known means for controllably producing mechanical motion such as an hydraulic ram. Increasing the angle of the inlet scoop causes more air flow through first smoothing means 120, cavity 80, and out aperture 70. (In FIG. 6, first and second flow smoothing means 110 and 120 have been omitted for clarity.) Decreasing the angle causes less air to pass through first smoothing means 110, duct means 100, second smoothing means 120, cavity 80, and out aperture 70. The pressure just upstream of the cavity is measured through first pressure sensing means 150. The pressure underneath the shear layer and within cavity 80 is measured through second pressure sensing means 160. In the preferred embodiment, first and second pressure sensing means 150 and 160 are static ports connected to a flow control means 170. It will be appreciated by one of ordinary skill in the art, however, that any suitable means of sensing pressure may be used. Flow control means 170, which in the preferred embodiment may be a differential pressure controller, senses the pressure via the first and second pressure sensing means 150 and 160, and causes intake control means 140 to adjust fluid extracting means 90 so that more air is admitted if the underlayer pressure as sensed by second pressure sensing means 160 is less than the pressure just upstream of aperture 70 as sensed by pressure sensing means 150, and so that less air is admitted if the opposite condition exits. In theory, the pressures sensed by first and second pressure sensing means 150 and 160 should be kept approximately equal. In the preferred embodiment, however, the under-shear-layer pressure sensed by second pressure sensing means 160 is maintained slightly higher than the pressure sensed by first pressure sensing means 150 to insure that the shear layer is not deflected into the cavity. The overpressure condition merely causes the shear layer to attach farther downstream on the contained ramp 180 with a rotation in refraction angle corresponding to the shear flow centerline rotation from the upstream surface direction.

As mentioned above, the theoretical minimum required inlet flow to the underside of the shear layer is about 3% of the incident freestream mass flow through an imaginary surface oriented transverse to the freestream having an area equal to that of aperture 70. The component combination of each of the first smoothing means and second smoothing means 110 and 120 respectively should typically cause a drop in pressure equal to about twice the local dynamic pressure which is controlled by the local channel cross-sectional area. If a honeycomb and screen combination is used, the honeycomb should have a cell aspect ratio of the order of 8 to 1 and the screen should have a porosity on the order of 50%. The resistance coefficient of the stage is roughly equal to the sum of the resistance coefficients of the components.

At aircraft cruise Mach numbers the Mach number of the flow entering the underside of the shear layer will typically be of the order of 0.03 times the outer shear flow edge Mach number. Cavity 80 under aperture 70 should have a cross-sectional area for flow around whatever optical equipment may be inside greater than about 2.5 times the area of aperture 70 so that the flow Mach number is on the order of 0.01. This removes surface interaction influences inside the enclosure which might adversely affect the uniformity of the flow entering the underside of the shear layer. The cross-sectional area of fluid extracting intake means 90 may be on the order of 0.1 the unobstructed enclosed flow area under the shear layer.

Ramp means 180, shown in FIGS. 3 and 6, and outlined in phantom in FIG. 5, will now be described. Ramp means 180 has a constant width and is bounded by parallel side walls 71 reaching from the separation edge to the upstream edge of the reattachment ramp 180. Although initial impingement angles up to 45° are possibly acceptable, shallower angles are much more preferable. The leading edge on the reattachment surface should be rounded to reduce the tendency for disturbance to the shear layer from underflow.

These details of ramp construction are preferred rather than necessary. The process of flow reattachment and collapse back to a normal turbulent boundary layer appears to be relatively insensitive to the actual ramp contour.

In general, by providing the proper static pressure match and unobstructed low velocity inflow, the viscous pumping of the shear layer will be self-regulating. The resulting shear layer is as thin as physically possible for a full velocity profile over a large aperture and, in fact, tends to become slightly thinner with increasing freestream Mach number rather than many times thicker as with any approach using obstructions such as a band or fence.

Figure 7:
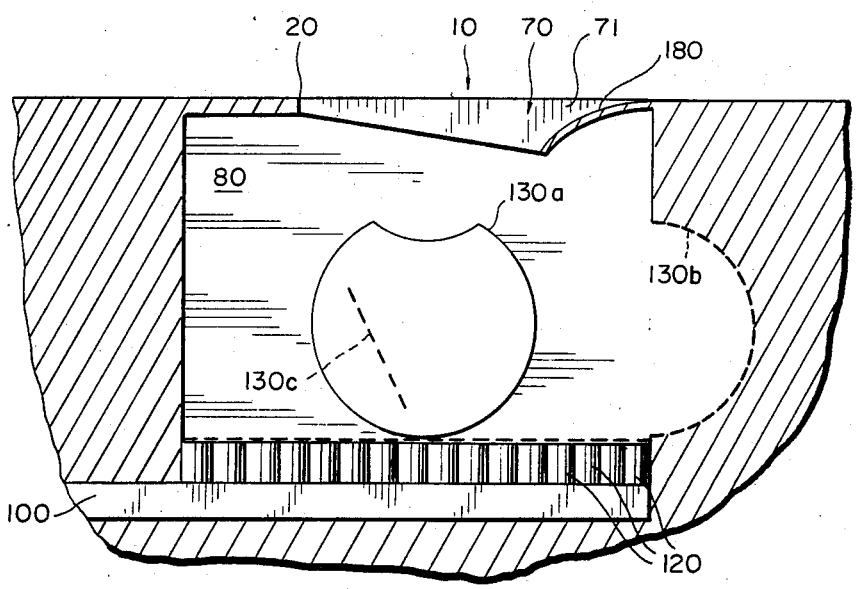
FIG. 7 is a diagrammatic side view of the invention.

It will also be apparent from FIG. 7 that the upstream edge of ramp means 180 is preferably disposed below the local surface of the fuselage. Thus, ramp means 180 "catches" the shear layer within cavity 80. In theory, the amount of fluid supplied through cavity 80 could, as mentioned above, be increased to the point that the lower border of the shear layer could be lifted until it was tangential to the local fuselage surface. The amount of fluid required to accomplish this, however, as mentioned above is estimated to be nearly three times what is necessary merely to prevent deflection. In addition, the effort could create a compression corner and accompanying shock, which would be detrimental from an aero-optic standpoint. Thus, it is thought preferable to keep the centerline of the shear layer, shown in phantom, in the streamwise direction, and dispose ramp means 180 within cavity 80 so that it can catch the shear layer, as shown in FIG. 7. It might nevertheless be desirable, however, to lift the shear layer completely when strong cross-flow is anticipated from maneuvering.

In a second preferred embodiment, the ramp means 180 is not contained by perpendicular side walls 71, but instead widens horizontally downstream of the aperture at the natural horizontal growth angle of the shear layer and slopes continuously into the adjoining surface. In such an arrangement, however, shear layers develop at the sides of the aperture and grow toward the center, reducing useful aperture width so that the aperture must widen in the downstream direction to maintain a constant useful aperture width. Flow over simple perpendicular side walls of the first embodiment thickens only as a normal boundary layer which in general, is slower than shear layer growth, and necessitates less widening of the aperture to compensate for loss of useful width, if any.

Ramp means 180 in either form is most advantageous when it is desired to collapse the flow, i.e., return its velocity profile to that of a normal boundary layer, as cleanly and smoothly as possible, as, for example, when there is more than one aperture, arrayed streamwise, so that essentially the same mass of air passes over each.

The fact that the aperture 70 has a smaller flow-through area than cavity 80 does not significantly degrade the uniformity with which air is fed to the shear layer. The shear layer's tendency to pump out the cavity dominates any effects attributable to cavity-aperture geometry because flow Mach number through the cavity and aperture is typically more than an order of magnitude less than the freestream Mach number.

The spheriod designated 130 in FIG. 7 represents a piece of optical equipment, and is included to show how such optical equipment might be disposed in cavity 80. Alternately, such equipment may be positioned outside of but adjacent the cavity as shown by number 130b in phantom lines. In this position, a mirror 130c is disposed within the cavity to direct the optical transmissions and receptions through the aperture 70.

Although the invention has been described by means of a preferred embodiment, it will be appreciated by those skilled in the art that numerous departures may be made from the details shown without departing from the teachings of the invention. It will therefore also be understood that this invention is not limited to the specific embodiment disclosed, but only according to the following claims.

What is claimed:

1. An apparatus for controlling a shear layer to optimize transmission of optical radiation therethrough comprising:
    a surface having an aperture therethrough, said shear layer formed by fluid passing over one side of said surface and said aperture;
    a cavity region positioned on the other side of said surface, said cavity region including said aperture;

means at least partially positioned within said cavity for at least one of (1) receiving said optical radiation from outside said cavity and (2) transmitting said optical radiation to the exterior of said cavity;

fluid intake means for directing fluid other than that passing over said aperture to pass into said cavity; and smoothing means positioned between said fluid intake means and said aperture for causing fluid flowing to said aperture to be uniform and free of flow channels and turbulence.

2. An apparatus as claimed in claim 1 wherein said intake means is located sufficiently remotely from said aperture that said shear layer is substantially unaffected thereby, said intake means being elevated above said surface so that fluid having substantially the freestream total temperature is extracted.

3. An apparatus as claimed in claim 2 further comprising:

means responsive to the pressure upstream of said aperture and the pressure within said cavity region, and connected to said intake means for controlling the flow of fluid from said intake means into said cavity region thereby maintaining said pressure within said cavity at least equal to said pressure upstream of said aperture so that deflection of said shear layer within said cavity region is substantially prevented.

4. An apparatus as claimed in claim 3 further comprising ramp means in said surface downstream from said aperture for facilitating reattachment of said shear layer.

5. An apparatus as claimed in claim 1 wherein said aperture is located in said surface at a position where the pressure distribution over said surface would have been substantially spatially uniform absent said aperture.

6. An apparatus for controlling a shear layer in a fluid flowing over a cavity region having an aperture in a surface to optimize transmission of optical radiation through the shear layer, said aperture located on said surface at a position where the pressure distribution over said surface would have been substantially uniform absent said aperture, said apparatus comprising:

fluid intake means for extracting fluid from the freestream flowing over said surface located sufficiently remotely from said aperture that stability of the shear layer over the aperture is not affected, said extracting means elevated from said surface;

means connected to said intake means and said cavity region for delivering fluid in a flow path from said intake means through said cavity region and then said aperture to feed said shear layer;

smoothing means positioned in the flow path of said delivering means for causing fluid flow to said aperture to be uniform and for preventing flow channels and turbulence;

ramp means downstream from said aperture for facilitating reattachment of said shear layer; and means responsive to the pressure upstream of said cavity region and the pressure within said cavity region, and connected to said extracting means for controlling the flow of fluid from said extracting means into said cavity region.

7. Apparatus for improving optical communication in an aircraft comprising:

a cavity region within said aircraft, said cavity region positioned adjacent a surface of the aircraft, said aircraft surface having an aperture opening into said cavity and experiencing a shear layer air flow pattern thereacross when said aircraft is in flight;

optical communication equipment within said aircraft and positioned in one of a position (1) within said cavity and (2) adjacent said cavity and operable for optical communication through said aperture;

means connected to said cavity region for directing air other than that passing over said aperture to pass through said cavity region and subsequently through said aperture to join air passing over said aperture; and smoothing means positioned within said directing means for causing fluid flowing to said aperture to be uniform and free of flow channels and turbulence.

8. An apparatus as claimed in claim 7 further comprising means connected to said directing means for extracting said other air from air not within said shear layer, said extracting means located sufficiently remotely from said aperture that said shear layer is substantially unaffected by said extracting.

9. An apparatus as claimed in claim 8 wherein said extracting means is positioned away from said surface to permit extraction of air at substantially the same total temperature as the total temperature of air in said shear layer.

10. An apparatus as claimed in claim 9 wherein said extracting means comprises a splitter plate and an inlet scoop.

11. An apparatus as claimed in claim 8 further comprising:

means responsive to the pressure upstream of said aperture and the pressure within said cavity region, and connected to said extracting means for controlling the flow of air from said extracting means into said cavity region thereby maintaining said pressure within said cavity region at least equal to said pressure upstream of said aperture so that deflection of said shear layer within said cavity region is substantially prevented.

12. An apparatus as claimed in claim 11 further comprising ramp means in said surface downstream from said aperture for facilitating reattachment of said shear layer.

13. An apparatus as claimed in claim 12 wherein said aperture is located in said surface at a position where the pressure distribution over said surface would have been substantially spatially uniform absent said aperture.

14. A method of stabilizing a shear layer in a fluid flowing over an aperture for enabling undistorted transmission of optical radiation therethrough comprising the steps of controllably feeding fluid to the underside of said shear layer through said aperture, smoothing said fluid prior to its passage through said aperture by removing flow channels and turbulence and performing at least one of the steps of (1) transmitting optical radiation through said aperture and (2) receiving optical radiation through said aperture.

15. A method as claimed in claim 14 wherein said feeding step further comprises the steps of:

extracting fluid from said flowing fluid at a position sufficiently remote from said aperture that flow over the aperture remains substantially unaffected; and conveying said extracted fluid from said remote position through said aperture.

16. A method as claimed in claim 15 further comprising the step of facilitating reattachment of said shear layer by providing ramp means downstream of and substantially adjacent to said aperture.

17. A method as claimed in claim 16 further comprising positioning said aperture on said surface where the pressure distribution absent said aperture would have been substantially spatially uniform.

18. A method as claimed in claim 15 wherein said extracting step includes taking fluid from a position which is elevated from the surface to permit extraction of fluid at substantially the same total tempeature as that of said shear layer.

19. A method of improving the propagation of optical radiation through a shear layer formed over an aperture into a cavity in the surface of an aircraft in flight comprising the steps of directing air other than that passing over said aperture to pass through said aperture to join said shear layer, smoothing said air prior to its passage through said aperture by removing flow channels and turbulence and performing at least one of the steps of (1) transmitting optical radiation through said aperture and (2) receiving optical radiation through said aperture.

20. A method as claimed in claim 19 wherein said directing step further comprises the steps of:
  extracting air from air flowing past said aircraft at a position sufficiently remote from said aperture so that said shear layer remains substantially unaffected by said extracting; and
  conveying said extracted air from said remote position through said aperture.

21. A method as claimed in claim 20 further comprising the step of facilitating reattachment of said shear layer by providing ramp means downstream of and substantially adjacent to said aperture.

22. A method as claimed in claim 21 further comprising positioning said aperture on said surface where the pressure distribution absent said aperture would have been substantially spatially uniform.

23. A method as claimed in claim 20 wherein said extracting step includes taking air from a position which is elevated from the surface to permit extraction of air at substantially the same total temperature as that of said shear layer.

24. An apparatus for controlling a shear layer comprising:
  a surface having an aperture therethrough, said shear layer formed by fluid passing over one side of said surface and said aperture;
  a cavity region positioned on the other side of said surface, said cavity region including said aperture, said cavity region having a porosity greater than approximately 50%;
  fluid intake means for directing fluid other than that passing over said aperture to pass into said cavity; and
  smoothing means positioned between said fluid intake means and said aperture for causing fluid flowing to said aperture to be uniform and free of flow channels and turbulence.

25. An apparatus for controlling a shear layer as recited in claim 24 wherein said smoothing means comprises a honeycomb structure having a plurality of cells and having a cell aspect ratio on the order of 8 to 1.

* * * * *